(12) United States Patent
Bundo

(10) Patent No.: US 6,471,159 B1
(45) Date of Patent: Oct. 29, 2002

(54) AIRSHIP SHAPED SPACE CRAFT

(76) Inventor: Mutsuro Bundo, 1238-4, Oaza, Miyoshi, Oita-shi, Oita-ken (JP)

(*) Notice: Subject to any disclaimer, the term of this patent is extended or adjusted under 35 U.S.C. 154(b) by 0 days.

(21) Appl. No.: 09/688,091

(22) Filed: Oct. 16, 2000

(30) Foreign Application Priority Data

Sep. 5, 2000 (JP) .......................................... 2000-268745

(51) Int. Cl.$^7$ ............................................... B64B 1/34
(52) U.S. Cl. ........................................... 244/26; 244/25
(58) Field of Search ..................................... 244/26, 25

(56) References Cited

U.S. PATENT DOCUMENTS

| | | | | |
|---|---|---|---|---|
| 3,120,932 A | * | 2/1964 | Stahmer | 244/24 |
| 3,180,588 A | * | 4/1965 | Fitzpatrick | 244/25 |
| 4,695,012 A | * | 9/1987 | Lindenbaum | 244/26 |
| 4,817,892 A | * | 4/1989 | Janeke | 244/15 |
| 5,082,205 A | * | 1/1992 | Caufman | 244/25 |
| 5,383,627 A | | 1/1995 | Bundo | |
| 5,730,390 A | * | 3/1998 | Plichta et al. | 244/23 |
| 5,836,542 A | * | 11/1998 | Burns | 244/12.2 |
| 6,119,983 A | * | 9/2000 | Provitola | 244/158 |
| 6,119,985 A | * | 9/2000 | Clapp et al. | 244/172 |
| 6,227,486 B1 | * | 5/2001 | Balepin | 244/73 |

* cited by examiner

*Primary Examiner*—Charles T. Jordan
*Assistant Examiner*—M. Thomson
(74) *Attorney, Agent, or Firm*—Wenderoth, Lind & Ponack, L.L.P.

(57) ABSTRACT

The present airship-shaped space craft has a middle fuselage extending in a fore-and-aft direction, and a pair of two outer fuselages extending in the fore-and-aft direction located symmetrically on both sides of the middle fuselage. In the above fuselages, gas of a specific gravity of which is smaller than that of air is filled, and the middle fuselage is connected with the outer fuselages by a horizontal wing. The horizontal wing is provided with propelling devices supported in a gimbal fashion for generating thrust in any optional direction, jet engines with backwards directed nozzles to be controlled within a range from a slantwise upward direction to a slantwise downward direction, and rocket engines with ejection nozzles to be controlled in right-and-left and up-and-down directions. During ascent of the space craft, at first the propelling devices, then the jet engines and at last the rocket engines are actuated so as to make the space craft reach and fly along a satellite orbit. Upon return of the space craft, the rocket engines, the jet engines and the propelling devices are actuated in reverse order, and aerodynamic heating at reentry into the atmospheric space can be reduced by making the space craft descend slowly. Also, control of the flight in the atmospheric space becomes easy, so that the space craft can safely and easily land on a predetermined narrow area of the ground.

4 Claims, 6 Drawing Sheets

AIRSHIP SHAPED SPACE CRAFT

BACKGROUND OF THE INVENTION

1. Field of the Invention

The present invention relates to an airship-shaped space craft which can be easily launched without utilizing a complicated construction and large scaled launching facilities, etc., and which can safely return to the ground.

2. Description of the Prior Art

In order to launch prior space craft, such as artificial satellites, which fly in outer space, usually one or a plurality of launching rockets, which are installed on the outside of the craft body, are used. They are burnt successively and then detached from the craft body so as to make the space craft reach a predetermined path around the earth outside of atmospheric space (hereinafter referred to as satellite orbit). In another type of prior art, launching rockets are installed in a space craft with a shape and a construction similar to an aircraft. The space craft can reach satellite orbit by thrust of the launching rockets. The space craft of the latter type is also called a "space plane".

However, large-scale launching facilities are necessary for both prior types of space craft and control of them during ascent and descent is complex. Further, both these prior space craft usually have shapes similar to that of an airplane, but their airfoil area cannot be made large enough as compared to their weight. Accordingly, it becomes difficult to control the flight of the space craft after it rushes into atmospheric space during its return flight, and difficult to land at a predetermined position. In addition, as the flight velocity when returning to atmospheric space is high, the space craft receives intense aerodynamic heating. It is thus necessary to adopt a complex structure for the space craft, and it becomes difficult to select appropriate materials for it. Further, in the prior space craft, it is impossible to use them repeatedly.

SUMMARY OF THE INVENTION

An object of the present invention is to solve the above mentioned problems in the prior art.

According to the present invention, there is provided an airship-shaped space craft comprising a gastight middle fuselage extending in a fore-and-aft direction and capable of receiving gas with a specific gravity smaller than that of air. A pair of gastight outer fuselages extend in the fore-and-aft direction, are arranged symmetrically on both sides of the middle fuselage, and are capable of receiving gas with a specific gravity smaller than that of air. A horizontal wing connects the middle fuselage with the outer fuselages. A cabin for accommodating men and facilities, etc. is provided on the horizontal wing. Propelling devices are supported by the horizontal wing in gimbal fashion and are controllable for generating thrust in any direction. Jet engines are provided on the horizontal wing, each of which have a nozzle directed backwards. The direction of each of the nozzles is controllable within a range from a slantwise upward direction to a slantwise downward direction. Rocket engines are provided on the horizontal wing, each of which have an ejection nozzle. A direction of each of the ejection nozzles is controllable in the right-and-left direction and the up-and-down direction (in the vertical plane and the parallel plane with respect to the horizontal wing).

Also, there is provided an airship-shaped space craft as set forth above wherein each of the middle fuselage and the outer fuselages has a longitudinally half-cut tear-drop shape. A flat lower end portion of each of them is gastightly connected to the horizontal wing.

Further, there is provided an airship-shaped space craft as set forth above wherein the propelling devices, the jet engines and the rocket engines are arranged symmetrically on both sides of the middle fuselage.

Due to the above mentioned structural features, the following advantages can be obtained.

At launch (takeoff) of the space craft of the present invention, at first the direction of each of the propelling devices is made upwards or slantly upwards so as to provide an upward thrust or a thrust having an upward component. By the thrust generated by the propelling devices as above, the buoyancy generated by the gas in the middle fuselage and the outer fuselages, the specific gravity of which is smaller than that of air, and the lift obtained by the horizontal wing, etc., the space craft can safely launch from the ground and thereafter can ascend in the air.

When the ascent by the propelling devices reaches a limit, the propelling devices are stopped and the jet engines are started. The direction of the nozzle of each of said jet engines is made downwards or slantly downwards so as to obtain an upward or slantly upward thrust. By this thrust, the space craft ascends.

Further, when the ascent by the jet engines reaches a limit, the jet engines are stopped and the rocket engines are started. The direction of the ejection nozzle of each of the rocket engines is made slantly downwards and backwards, so as to obtain a thrust the direction of which is forward and upward. By this thrust, the space craft ascent accelerates, and then it flies around the earth along a satellite orbit as a space station or an artificial satellite.

At the return of the space craft according to the present invention, the rocket engines, the jet engines and then the propelling devices are actuated in opposite order with respect to the ascent. At the same time, the amounts and the directions of them are also controlled. By these measures, the descending velocity of the space craft can be sufficiently reduced. Accordingly, aerodynamic heating when the space craft rushes into the atmospheric space is prevented and the space craft can easily be guided with a predetermined velocity and along a predetermined path. Further, at low height, where the propelling devices are used, the operation of the space craft becomes easy, and so it can easily, safely and correctly land on a narrow area of the ground.

In addition, by the longitudinally half-cut tear-drop shaped and gastight middle and outer fuselages, the flight performance can be improved without an increase in air resistance. By the symmetric arrangement of the propelling devices, the jet engines and the rocket engines on both sides of the middle fuselage, a stable flight can be realized.

Further, as the space craft of the present invention can perform flight as above, it can come back without any damage. Accordingly, it can be repeatedly used, similar to an ordinary airplane.

The above-mentioned and other objects, features and advantages of the present invention will become more apparent by referring the following description of an preferred embodiment of the present invention taken in conjunction with the accompanying drawings.

DETAILED DESCRIPTION ON THE PREFERRED EMBODIMENT

The present invention will now be described in detail in connection with one preferred embodiment of the present invention illustrated in FIGS. 1 to 7.

Numeral 1 designates a gastight middle fuselage extending in a fore-and-aft direction of the craft body (the usual flight direction) and having a longitudinally half-cut tear drop shape oriented in the fore-and-aft direction. The middle fuselage 1 is connected to a horizontal wing 3, which will be explained later, and constitutes a gas chamber which receives gas, such as helium, with a specific gravity smaller than that of air. Inside of the middle fuselage 1 is provided a skeleton made of an appropriate lightweight and heat-resistant material such as titanium alloy or other superalloy, etc., and an outer shell of the middle fuselage, is also made of an appropriate lightweight and beat-resistant material such as titanium alloy or other superalloy etc. and with a necessary thickness so as to form a gastight construction.

Numerals 2, 2 designate outer fuselages, which are symmetrically arranged on both sides of the fuselage 1 at the same distance therefrom. The fuselages 2, 2 have the same size and the same shape with each other, and constitute gas chambers which receive gas, such as helium, with a specific gravity smaller than that of air, similar to the middle fuselage 1. The sizes of the outer fuselages 2, 2 are smaller than that of the middle fuselage 1, but their shapes are similar to that of the middle fuselage. Inside of each of the outer fuselages 2, 2 is provided a skeleton and a shell made of an appropriate lightweight and heat-resistant material similar to that used in the middle fuselage 1. However, since the outer fuselages 2 employ gas at the same pressure as the middle fuselage 1, a tensile strength of the outer shell of the outer fuselages 2, which depends upon their diameter, can be made smaller than that of the middle fuselage 1. Therefore, for the purpose of keeping the craft lightweight, an outer shell somewhat thinner than that of the middle fuselage 1 is employed for the outer fuselages 2, 2.

Numeral 3 designates a horizontal wing connecting the middle fuselage 1 and the outer fuselages 2 and generates lift. As a matter of course, it also contributes to the rolling stability of the space craft. For the purpose of maximizing lift and exhibiting a sufficient strength, a delta-shaped airfoil is employed. The airfoil cross sections taken in the direction of flight have a common shape. Thus, according to Bernoulli's law, air will flow along its upper surface at a high velocity and low pressure, while air will flow along its lower surface at a low velocity and high pressure (normal pressure). A plurality of airfoil-shaped ribs are covered by outer shells and are appropriately riveted or welded.

Figure 1:
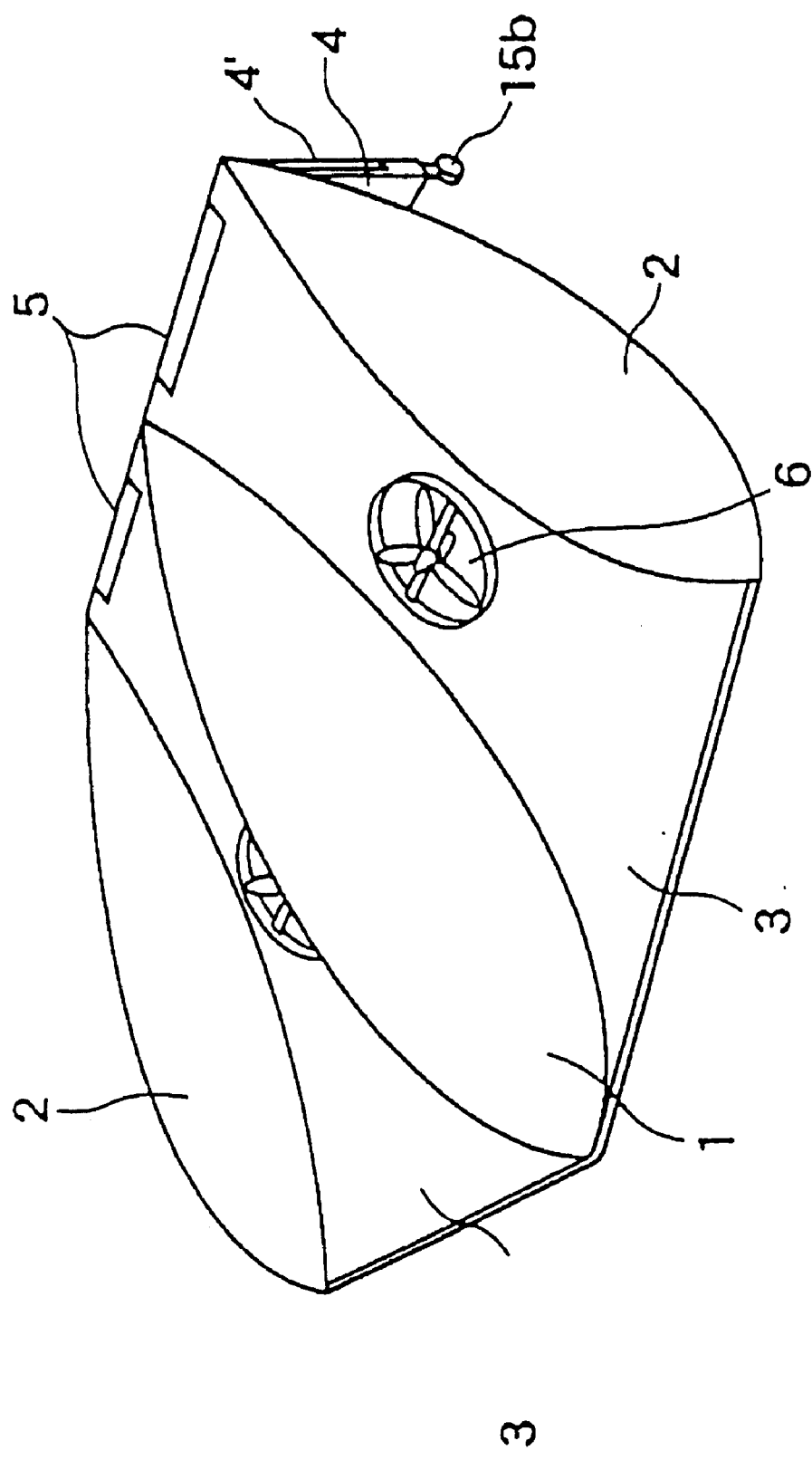
FIG. 1 is a perspective view of one embodiment of an airship-shaped space craft according to the present invention.

As shown in FIG. 1, an opened flat lower end portion of each of the middle fuselage 1 and the outer fuselages 2, 2 is fixed on an upper surface of the horizontal wing 3 so as to be gastightly closed. The middle fuselage 1 is fixed on the central part of the horizontal wing 3 and the outer fuselages 2 are fixed on the tips of the horizontal wing 3.

Numerals 4, 4 designate left and right vertical tails with vertical rudders 4' extending vertically at the rear portion of the horizontal wing 3. Numerals 5, 5 designate elevators provided along the rear edge of the horizontal wing 3 and symmetrically on both sides of the middle fuselage 1.

Left and right propelling devices 6 are provided in holes, which are located in the horizontal wing 3 symmetrically on both sides of the middle fuselage 1. These tails 4, elevator 5 and propelling devices 6 are made of an appropriate lightweight and heat-resistant material such as titanium alloy or other superalloy, etc.

In order that propeller 7 can be directed in any direction in three dimensions, the propeller 7 and an engine 8 for rotating the propeller 7 are supported via a gimbal 9 of the propelling device 6.

Figure 3:
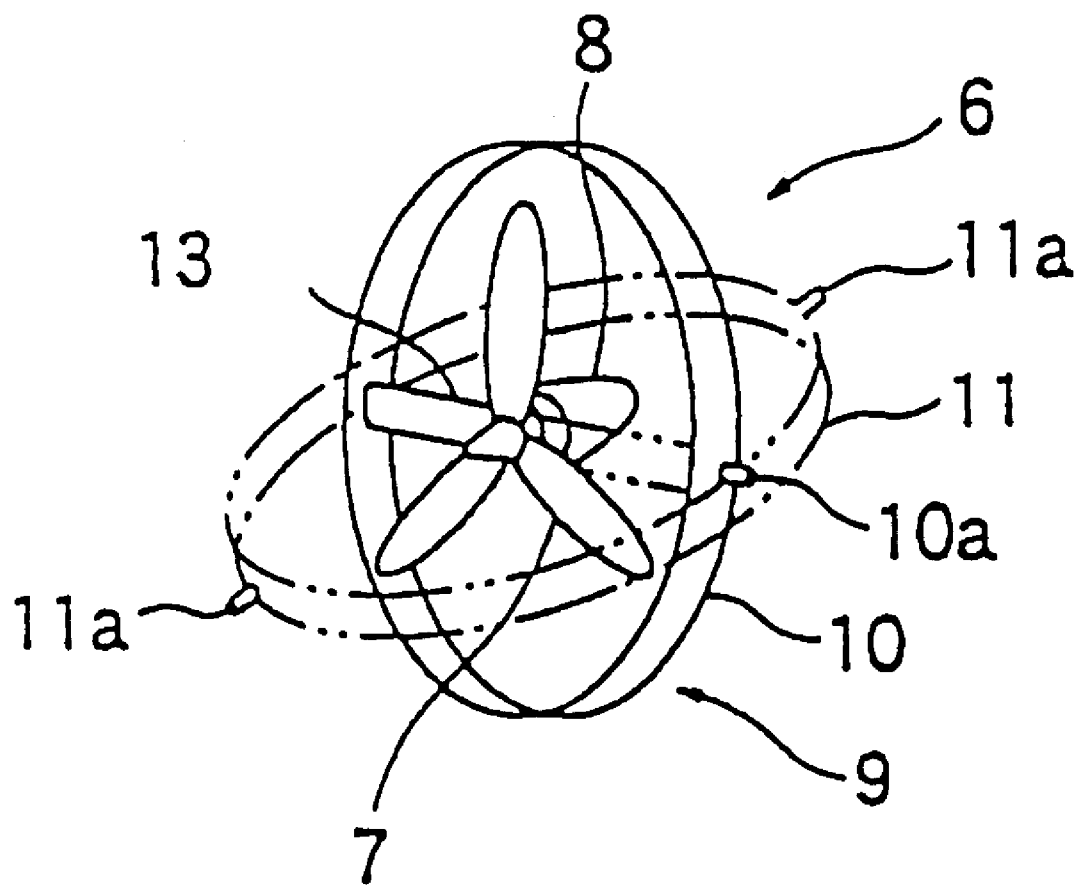
FIG. 3 is an enlarged schematic view of a propelling device of the same space craft.
Figure 4A:
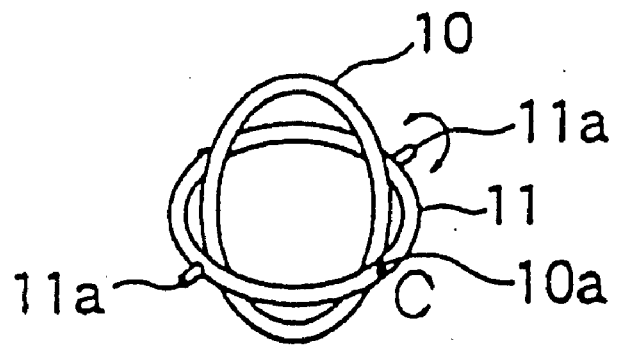
FIGS. 4(a)-4(c) are perspective views of the propelling device showing relative positions between an inner frame and an outer frame of a gimbal, with FIG. 4(a) showing a state in which the inner frame is perpendicular to the outer frame, FIG. 4(b) showing a state in which the inner frame is positioned along the outer frame, and FIG. 4(c) showing a state in which the inner frame is inclined with respect to the outer frame.
Figure 4B:
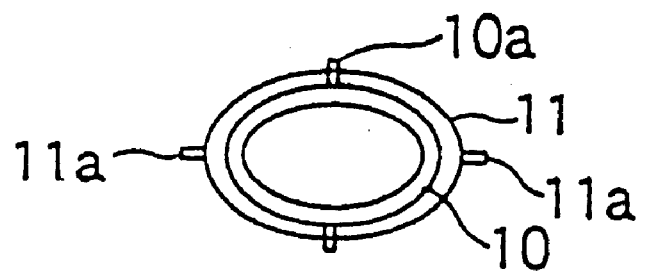
Figure 4C:
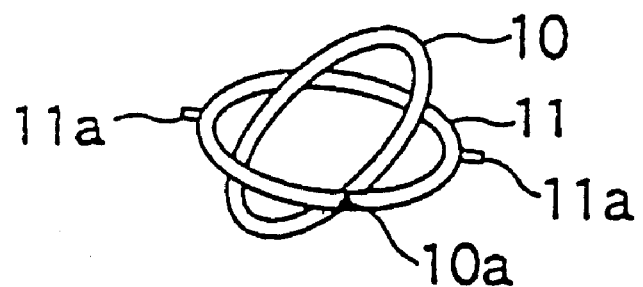
Figure 5:
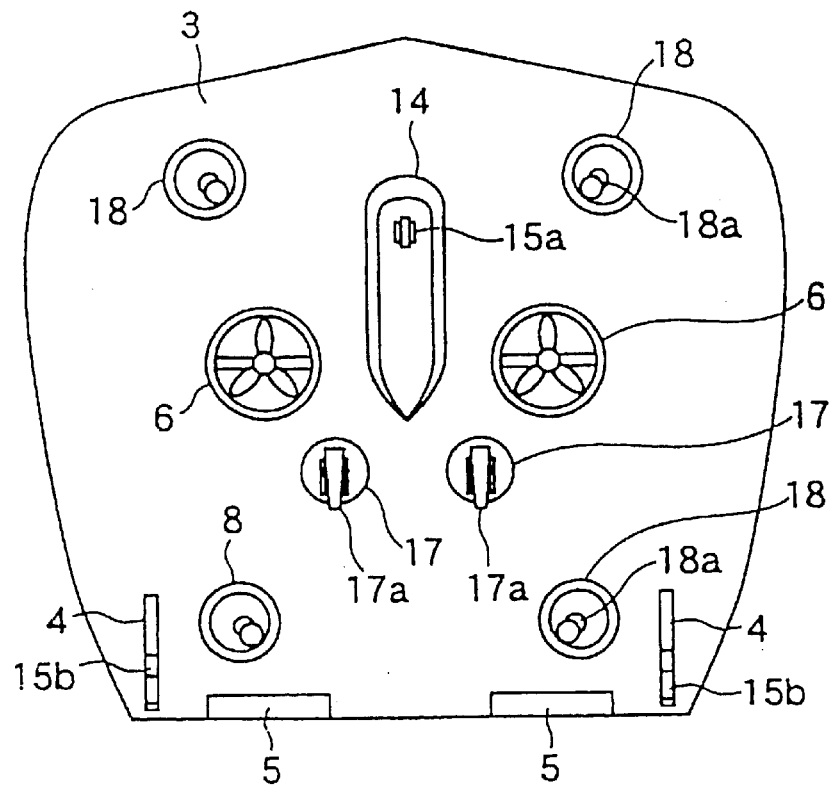
FIG. 5 is a reverse view of the same space craft.

More particularly, with reference to FIG. 3, an inner frame 10 and an outer frame 11 of the gimbal 9 are supported so as to be rotatable with respect to each other about orthogonal axes passing through the center of the propelling device 6. The inner frame 10 supports the propeller 7 and the engine 8 at its center via a beam 13 and is itself rotatably supported by the outer frame 11 via two left and right inner shafts 10a which extend in directions perpendicular to the direction of the flight. One of the inner shafts 10a is hidden from view in FIG. 3 behind the inner frame 10 and the back of the beam 13. The outer frame 11 is rotatably supported by the horizontal wing 3 via front and rear outer shafts 1 la extending horizontally from the outer periphery of the horizontal wing 3. In other words, the propeller 7 and the engine 8 are not constrained by the orientation and inclination of the craft and are thus supported by the horizontal wing 3 in a manner similar to a compass in a gyrocompass. The beam 13 that extends in the inner frame 10 passes through the center of a circle coincident with the inner frame and has opposite ends fixedly secured to the inner frame 10. The propeller 7 and the engine 8 are rotatably supported at the center of beam 13.

Although not shown, one inner shaft 10a is directly connected to an output shaft of a drive device such as a low-speed large-torque irreversible servo motor fixedly secured to the outer frame 11. Hence, the inner shaft 10a can be rotated over various angles and can be stopped (controlled) by a pilot but it will not rotate in response to a reactive torque transmitted from the inner frame 10 and the propeller 7. Likewise, an outer shaft 11a is also directly connected to an output shaft of a drive device such as an irreversible servo motor fixedly secured to the horizontal wing 3. Accordingly, a notch for accommodating the drive device fixedly secured to the outer frame 11 is provided in the horizontal wing 3, but for the purpose of simplifying the drawings, the notch is not shown.

In addition, the respective drive devices for the inner shaft 10a and the outer shaft 11a can be jointly controlled. For instance, in order to turn the propeller 7 directed forwards (the state shown in FIG. 3) 45° to the left with respect to the forward direction, it is necessary to rotate the inner shaft 10a by 45° and the outer shaft 11a 90° to place the outer frame 11 in a vertical attitude. With joint control these rotations can be achieved simultaneously in response to a one-shot manipulation of a control stick. Moreover, a computer and various sensors for detecting environmental conditions such as airspeed, wind direction and the like are operatively associated to compensate for external disturbances such as, for instance, the influence of a crosswind dependent upon a distance between the center of gravity and the center of aerodynamic forces. Accordingly, when the airship is to be turned to the same horizontal 45° inclined direction, the rates of rotation of the respective drive devices for the inner shaft 10a and the outer shaft 11a would be controlled depending upon the attitude of the space craft, the crosswind, the wind velocity and the like.

Numeral 14 designates a gastight cabin fixed to the lower surface of the horizontal wing 3, which accommodates crew such as a pilot and necessary facilities, and which also can cut off a radioactive field and a magnetic field. The cabin is located at the lateral center of the horizontal wing 3 and also ahead of the longitudinal center of the horizontal wing 3.

15a is a retractable front wheel provided on the lower surface of the cabin 14 and 15b is a retractable rear wheel provided on the lower part of each vertical tail 4. The cabin 14, front wheel 15a and rear wheel 15b are also made of lightweight, heat resistant and gastight material such as titanium alloy or other superalloy, etc. The front and rear wheels 15a, 15b do not move fast on the ground at takeoff and landing, as a normal aircraft, as hereafter explained, and so they can be made of a titanium alloy or other superalloy, etc. However, as they are retractable, rubber can be adopted for their tires.

On the front side of the cabin 14, a control chamber is provided, and also a gas tank and a high pressure gas pump, are provided therein, in a place where the crew would not be injured in an accident. Before flight, lightweight gas such as helium gas is fed from the gas tank through pipings into the middle fuselage 1 and the outer fuselages 2, whereby buoyancy is generated. On the contrary, at necessary occasions, which will be explained later, the gas in the middle fuselage 1 and the outer fuselages 2 is sucked into the gas tank under high pressure by the high-pressure gas pump.

The pressure of the gas in the middle fuselage 1 and the outer fuselages 2 is equal to or higher than the atmospheric pressure, whereas the pressure in the gas tank naturally becomes high because a large volume of gas withdrawn from the middle fuselage 1 and the outer fuselages 2 is stored within the comparatively small volume of the tank.

Further, it is desirous to adopt the following construction. That is, the propelling devices 6 are located between the center of gravity of the craft and the center of aerodynamic forces (as viewed from the side). The moment about the center of gravity (downwards) located to the front of a vertical line passing through the propeller 7 and the moment about the center of aerodynamic forces (downwards) located aft of the vertical line are mutually offset, and so, the craft does not tilt in the front-rear direction when it ascends, keeping a horizontal attitude (for example, at takeoff).

Figure 2:
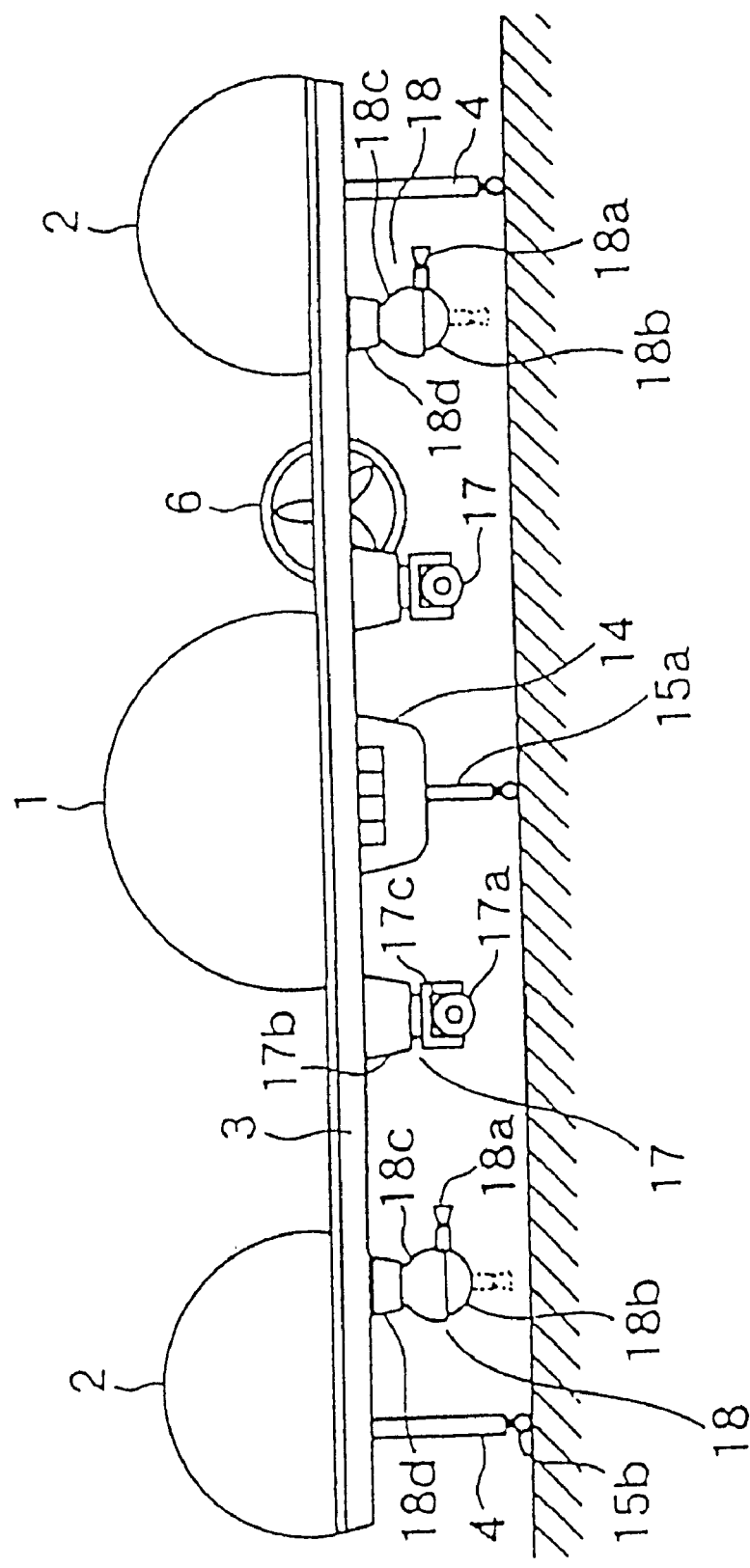
FIG. 2 is a front view of the same space craft.
Figure 6:
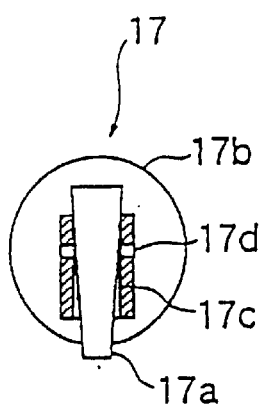
FIG. 6 is an explanatory drawing of a jet engine of the same space craft partially broken.

A pair of jet engines 17, 17 are provided laterally symmetrically with respect to the middle fuselage 1 (the longitudinal axis of the craft) on the lower surface of the horizontal wing 3 on the rear side of the cabin 14 and also on the rear side and inner side of the propelling devices 6, 6. As shown in FIG. 2, a longitudinally extending holding portion 17c with a reversed U-shaped section is provided on a lower part of a base portion 17b, which is fixed to the lower surface of the horizontal wing 3, so as to be rotatable around the vertical axis of the base portion 17b. As shown in FIG. 6, a jet engine main body 17a with a rearwards directed nozzle is inserted in the holding portion 17c so as to be embraced thereby, and horizontal axes 17d, 17d, fixed to both sides of the jet engine main body 17a, are rotatably supported by the holding portion 17c. Due to this construction, when the holding portion 17c is rotated with respect to the base portion 17b and the axes 17d, 17d are rotated and then stopped by a drive device, such as a servo motor or an electric motor (not shown), by a pilot's operation or by actuation of a control device in the cabin 14, the jet engine main body 17a with the rearwards directed nozzle can take an optional slantwise upwards or downwards inclined attitude and also a slantwise rightwards or leftwards inclined attitude.

Further, the jet engine 17 can make its exhaust gas direction deviate to any optional direction by the pilot's operation or actuation of a control device in the cabin 14 within a range from a normal rearward direction to a forward direction, like known jet engines of an airplane.

Figure 7:
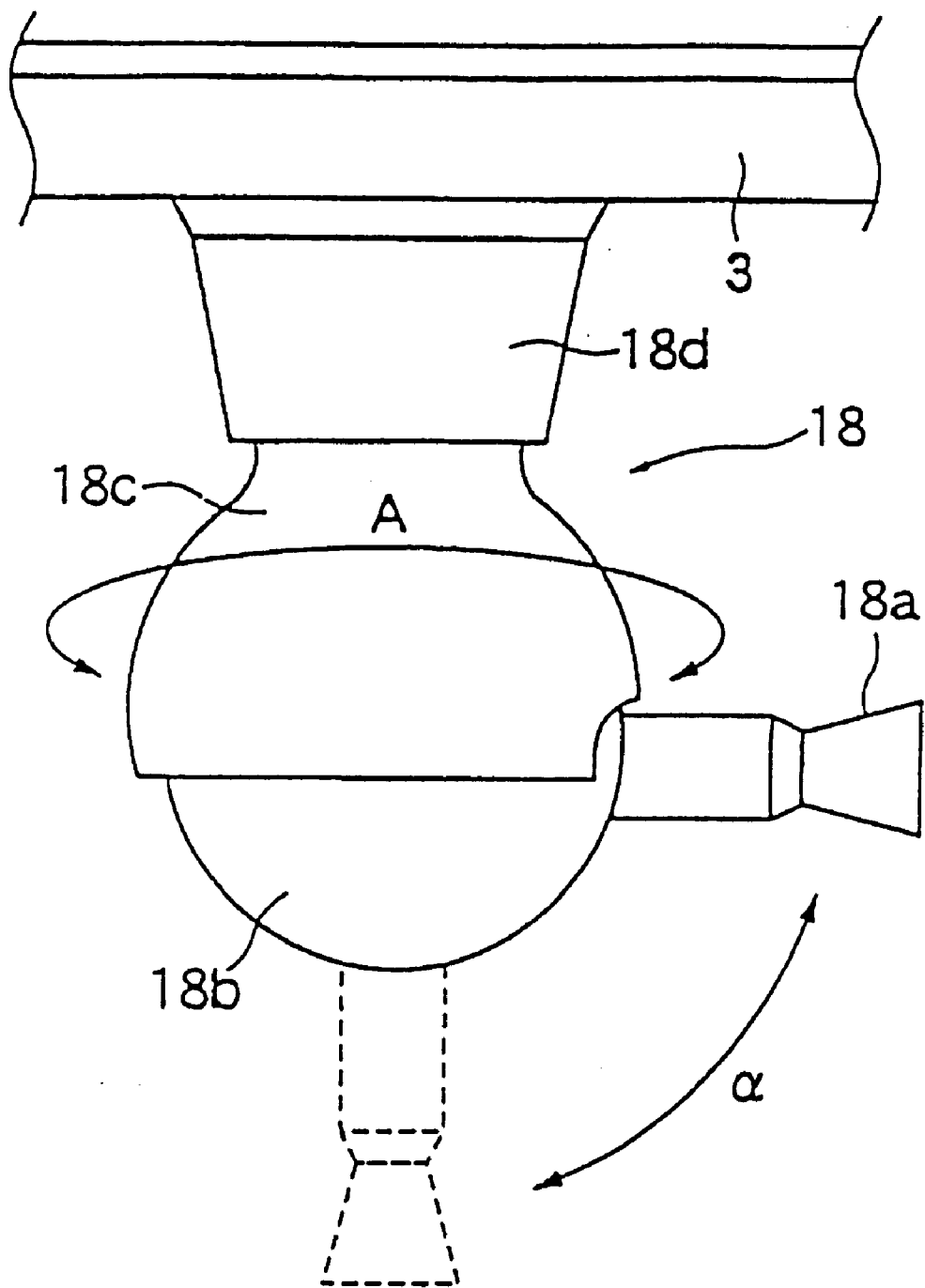
FIG. 7 is an explanatory drawing of a rocket engine of the same space craft.

At the front and rear positions of the lower surface of the horizontal wing 3, near the tips thereof, are two pairs of rocket engines 18, 18; and 18, 18 are laterally symmetrically provided. As shown in FIG. 7, each rocket engine 18 has a base portion 18d fixed to the lower surface of the horizontal wing 3 and extending downwards. From a lower end of the base portion 18d, a top axial portion of a rotating portion 18c is inserted into the base portion 18d. The rotating portion 18c is supported by the base portion 18d so as to be capable of rotating around a perpendicular line with respect to the horizontal wing 3, as shown by an arrow A in FIG. 7. The rotating portion 18c has a spherical shape, the lower part of which is cut off. From the lower end of the rotating portion 18c, a spherical head part 18b of an ejection nozzle 18a is inserted thereinto. A horizontal axis (not shown) fixed to the head part 18b near its top is rotatably supported by the rotating portion 18c. Due to this construction, the ejection nozzle 18a can rotate with respect to the rotating portion 18c within a range of a right angle from the vertical direction to the horizontal position as shown by an arrow a in FIG. 7. The rotating portion 18c and the ejection nozzle 18a can be rotated and stopped at any optional position by a pilot's operation or by actuation of a control device such as a servo motor or an electric motor in the cabin 14.

As the fuel of the rocket engines 18, it is possible to use liquid fuel in the cabin 14 or solid fuel installed in the engines 18. Further, the rocket engines 18 and the jet engines 14 are to have power enough to make the space craft get out the atmospheric space of the earth and fly along the satellite orbit.

Next, the operation of the space craft, an embodiment of the present invention, will be described. The space craft is moored to a mooring device under the condition that gas with specific gravity smaller than that of air within the middle fuselage 1 and the outer fuselages 2 is sucked into the gas tank in the cabin 14 by the high-pressure gas pump, not shown. In this case, an optional attitude of the space craft within a range from the vertical direction to the horizontal direction can be adopted according to the state of takeoff (launching), which will be explained later.

At the takeoff (launching), gas with a specific gravity smaller than that of air is filled within the middle fuselage 1 and the outer fuselages 2 from the gas tank in the cabin 14 so as to generate buoyancy, and then the propelling device 6 is started. When the buoyancy and the thrust of the propelling devices 6 are large enough, the space craft ascends vertically upwards by mooring the space craft vertically by a mooring device on the ground and also by making the attitude of the propellers 7 of the propelling devices 7 vertically upwards.

Under certain circumstances, the following takeoff is also possible. That is, the space craft is moored horizontally or slantwise upwards, and by making the direction of the thrust of the propellers 7 slantwise upwards and also by operating the elevator 5, etc., the attitude of the space craft is inclined slantwise upwards, and the space craft ascends slantwise upwards by the buoyancy of gas in the middle fuselage 1 and the outer fuselages 2, 2, the thrust of the propelling devices 6 and the lift of the horizontal wing 3. In this case, it is sometimes desirous, for the sake of safety, to make the space craft ascend to a predetermined height with the horizontal attitude by the buoyancy of the gas and the vertically upward thrust of the propelling devices 6 caused by directing the propeller 7 vertically upwards, and then make the space craft ascend slantwise upwards by the buoyancy of the gas, the lift of the horizontal wing 3 and a slantwise upward thrust of the propelling devices 6, caused by directing the propellers slantwise upwards.

When a flight path for making the space craft ascend with a horizontal attitude is adopted as above, it is possible to make the space craft safely ascend to a predetermined height, preventing fore-and-aft inclination (tilt in the front-rear direction), when the propelling devices 6 are located between the center of gravity of the craft and the center of aerodynamic forces (as viewed from the side) as described above.

When the space craft ascend to some height, for example, several hundred meters above the ground, the difference between the gas pressure within the middle fuselage 1 and the outer fuselages 2, 2 and the surrounding air pressure becomes large as the latter becomes lower. Accordingly, the gas within the middle fuselage 1 and the outer fuselages 2, 2 is gradually sucked into the gas tank within the cabin 14 by the high-pressure gas pump (not shown). In this case, although the buoyancy of the middle fuselage 1 and the outer fuselages 2, 2 becomes lower by the dropping of the surrounding air pressure, it is compensated by the above recovery of gas within the middle fuselage 1 and the outer fuselages 2, 2 into the gas tank and an increase of thrust of the propelling devices 6 so as to continue the ascent of the space craft.

When the ascent of the space craft by the propelling devices 6 reaches the limit, the propelling devices 6 are stopped and ascent by the jet engines 17 begins. It is possible to make the space craft ascend vertically upwards with vertically upward attitude by directing the nozzles 17a of the jet engines 17 vertically downwards. It is also possible to make the space craft ascend slantwise upwards, keeping its slantwise upward attitude, by directing the nozzles 17a of the jet engines 17 slantwise downwards or by directing the exhaust gas from the nozzle 17a slantwise downwards. Of course, with a slantwise upward ascent of the space craft as above, the lift of the horizontal wing 3 is also utilized. As the direction of the nozzles 17a of the jet engines 17 and that of the exhaust gas from the nozzles 17a can be set at an optional direction rearwards and slantwise downwards and also rearwards and right-and-left, the space craft can ascend efficiently and also can obtain the necessary speed directed to a predetermined direction. The thrust of the jet engines 17 and their attitudes, etc. are controlled by the pilot's operation or by the actuation of the control device within the cabin 14.

When the ascent of the space craft by the jet engines 17 as above reaches the limit, the jet engines 17 are stopped and the rocket engines 18 are started, and the ascent and the advance of the space craft by the thrust obtained by the ejected gas from the ejection nozzles 18 start. In this case, as the height of the space craft becomes high and the density of the surrounding air becomes so small that the resistance of air can be ignored, it is possible to realize an optional attitude of the space craft, within a range from the horizontal direction to the vertical direction, by controlling the direction of the thrust of each of the four rocket engines 18, within a range from the near horizontal direction to the vertically downward direction, and the magnitude of the thrust. In order to control the speed and the attitude of the space craft as above, the direction and the magnitude of the output of each ejection nozzle 18a are appropriately controlled by the pilot's operation or by the actuation of the control device in the cabin 14. The space craft having thus escaped from atmospheric space obtains the necessary horizontal speed and flies along a satellite orbit around the earth with a predetermined speed as an artificial satellite or a space station.

At the return of the space craft which flies along the satellite orbit around the earth, the ejection nozzles 18a of the rocket engines 18 are controlled by pilot's operation or by actuation of the control device within the cabin 14 so as to direct them forwards and slantwise downwards and also to obtain a thrust with an appropriate magnitude. Accordingly, the resultant thrust of four rocket engines 18 is directed rearwards and slantwise upwards. The rearward component of the thrust of the rocket engines 18 reduces the velocity of the space craft and makes the space craft descend from the satellite orbit, and the upward component of the thrust of the rocket engines 18 reduces the descending speed of the space craft. Accordingly, the space craft descends along a predetermined path while decreasing its velocity. The space craft rushes into the atmospheric space by its descent, however, as its velocity is reduced as above, the aerodynamic heating acting on the space craft can be remarkably decreased.

After the descent of the space craft as above, its descent by the jet engines 17 begins. In this case, the space craft is at the height where diluted air is in existence. Accordingly, the nozzles 17a are directed slantwise laterally and slantwise downwards or the direction of their exhaust gas is set so as to obtain upward, to longitudinal and lateral components of the thrust. By maintaining an appropriate relation between the thrust of the jet engines 17 as above, the lift of the horizontal wing 3, the resistance of the space craft and the gravity, etc., the space craft can descend at an appropriate speed and along an appropriate path. The magnitude and the direction of the jet engines 17 and the attack angle of the horizontal wing 3, etc. are controlled by pilot's operation or by actuation of the control device in the cabin 14.

When the space craft descends to the height where the density of air reaches a predetermined value, flight by the propelling devices 6 begins and the jet engines 17 are stopped. In this case, the direction of the propeller 7 of each propelling device 6 is selected to an optional direction, and the space craft can fly in a manner similar to that of an airplane or an airship by the thrust of the propelling device 6, the lift of the horizontal wing 3 and the resistance of the space craft, etc. Further, as the pressure of surrounding air acts on the middle fuselage 1 and the outer fuselage 2, 2, the gas having specific gravity smaller than that of air accumulated in the gas tank in the cabin 14 is gradually refilled into the middle fuselage 1 and the outer fuselages 2, 2 so as to generate buoyancy to be used in flight and also so as to prevent the occurrence of stress in the middle fuselage 1 and the outer fuselages 2, 2 by the surrounding air pressure.

Control of the propelling devices 6, change of the attack angle of the horizontal wing 3, and re-filling of the gas into the middle fuselage 1 and the outer fuselages 2, 2 are carried out by pilot's operation or by actuation of the control device in the cabin 14.

As described above, the speed of the space craft is reduced and the flight of it can be easily controlled similar to an ordinary airplane or airship, by the thrust of the driving devices 6, the lift of the horizontal wing 3 and the buoyancy obtained by the gas within the middle fuselage 1 and the outer fuselages 2, 2. Accordingly, the space craft can safely land on a predetermined place on the ground without any damage and without necessitating a wide landing area.

As explained above, the space craft of an embodiment of the present invention can safely launch (takeoff) from a narrow space on the ground, can safely and easily reach a satellite orbit, and flies along the satellite orbit. Upon returning, the aerodynamic heating at reentry into the atmospheric space is sufficiently decreased by reducing the speed of the space craft. Further, in the atmospheric space, the flight of the space craft is carried out with low speed and in an easily controllable state like an ordinary airplane or airship, and so the space craft can easily and correctly land on a narrow area on the ground.

Furthermore, as the space craft of the present invention can return on the ground without any damage, it can be repeatedly used, so that cheaper flight can be realized compared to known space craft.

While a principle of the present invention has been described above in connection with one preferred embodiment of the invention, it is intended that all matters contained in the above description are to be interpreted as illustrative of the invention and not in a limiting sense. Many modifications and variations are possible within the scope of the claims.

What is claimed is:

1. An airship-shaped space craft comprising:
   a gastight middle fuselage extending in a fore-and-aft direction and capable of receiving gas with a specific gravity smaller than that of air;
   a pair of gastight outer fuselages extending in the fore-and-aft direction, arranged symmetrically on both sides of said middle fuselage, and capable of receiving gas with a specific gravity smaller than that of air;
   a horizontal wing, said middle fuselage and said outer fuselages being connected with said horizontal wing;
   a cabin on said horizontal wing;
   propelling devices that are gimbal supported by said horizontal wing such that said propelling devices are controllable to generate thrust in different directions;
   jet engines provided on said horizontal wing, wherein said jet engines have nozzles that are directed in a backwards direction, and wherein said nozzles are controllable within a range from a slantwise upward direction to a slantwise downward direction with respect to said horizontal wing; and
   rocket engines provided on said horizontal wing, wherein said rocket engines have ejection nozzles, and wherein said ejection nozzles are controllable in direction in a right-and-left direction and in an up-and-down direction with respect to said horizontal wing.

2. The space craft of claim 1, wherein each of said middle fuselage and said outer fuselages has a shape of a tear-drop cut in half longitudinally, and wherein each said middle fuselage and said outer fuselages has a flat lower side that is gastightly connected with said horizontal wing.

3. The space craft of claim 1, wherein said propelling devices, said jet engines and said rocket engines are arranged symmetrically on both sides of said middle fuselage.

4. The space craft of claim 1, wherein said propelling devices, said jet engines and said rocket engines are arranged symmetrically on both sides of said middle fuselage.

* * * * *